United States Patent [19]

Ruggiero

[11] Patent Number: 4,562,085

[45] Date of Patent: Dec. 31, 1985

[54] PRODUCTION OF FRUIT PRESERVES

[75] Inventor: Frank J. Ruggiero, Stroudsburg, Pa.

[73] Assignee: Alfa-Laval, Inc., Poughkeepsie, N.Y.

[21] Appl. No.: 658,530

[22] Filed: Oct. 9, 1984

[51] Int. Cl.$^4$ .............................................. A23L 1/06

[52] U.S. Cl. .................................. 426/577; 426/639; 426/492

[58] Field of Search .............. 426/573, 576, 577, 615, 426/639, 492

[56] References Cited

U.S. PATENT DOCUMENTS

| | | | |
|---|---|---|---|
| 2,161,238 | 6/1939 | Stanton | 426/577 |
| 2,186,044 | 1/1940 | Rooker | 426/577 |
| 2,783,153 | 2/1957 | Lebeson | 426/577 |
| 3,034,901 | 5/1962 | Leo et al. | 426/577 |
| 3,493,394 | 2/1970 | Eldridge et al. | 426/577 |

Primary Examiner—Robert Yoncoskie
Assistant Examiner—Marianne M. Cintins
Attorney, Agent, or Firm—Cyrus S. Hapgood

[57] ABSTRACT

To a previously agitated blend of fruit and sugar is added a water solution of pectin to form a premix which is heated to 90°–125° F. during gentle agitation. After adding an acid solution to the premix, it is heated to 135°–145° F. and passed through an evaporation zone at 145°–160° F. under a vacuum of 20-27 inches Hg., all during gentle stirring, to obtain a concentrated product which is then heated to a sterilizing temperature and passed through a holding zone at such a temperature. The resulting product, after cooling, is a fruit preserve concentrated to a desired degree, such as 65° Brix, and in which the fruit has retained its particulate identity and integrity and is well distributed in the preserve.

9 Claims, 1 Drawing Figure

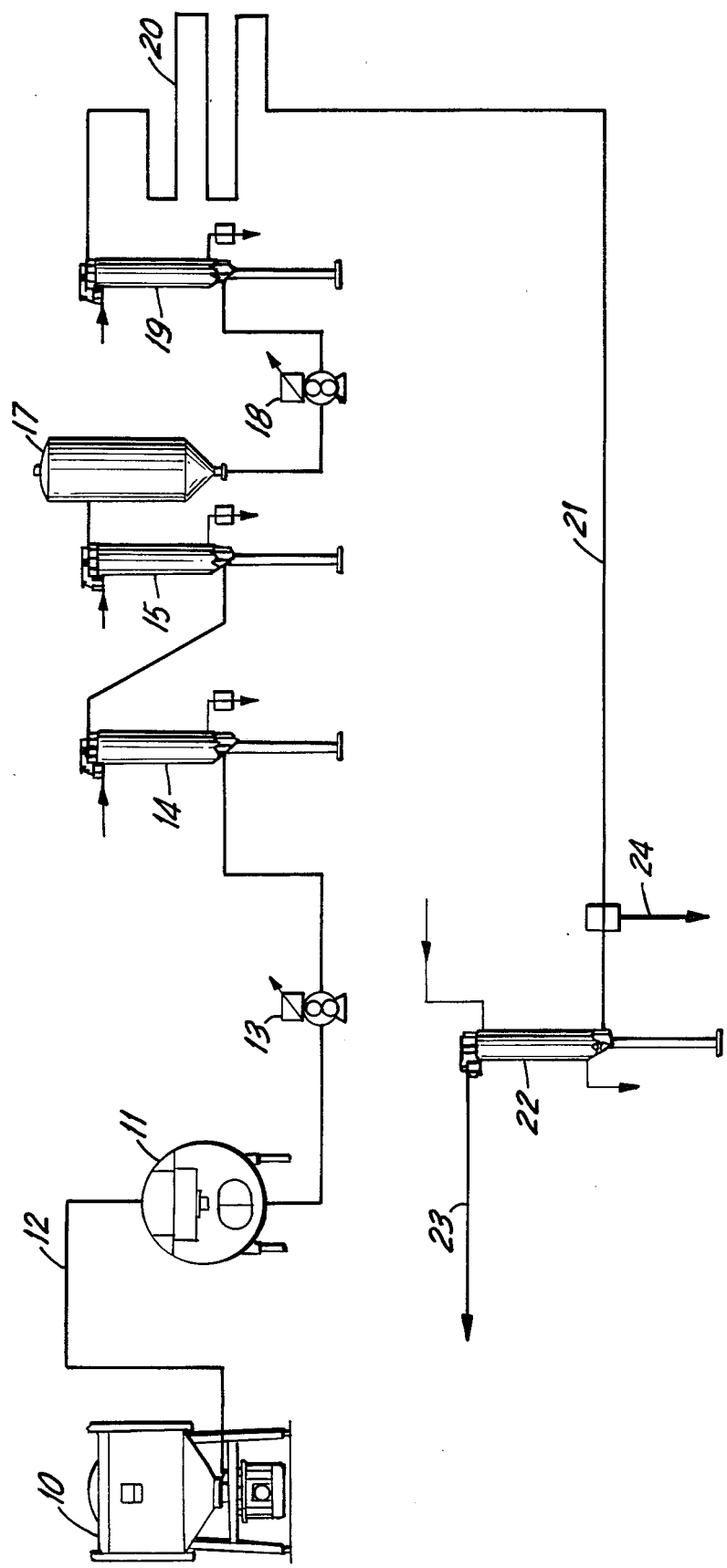

PRODUCTION OF FRUIT PRESERVES

This invention relates to the production of fruit preserves and more particularly to a novel method of concentrating, sterilizing and cooling such preserves while retaining good identity and integrity of the fruit.

Fruit preserves, such as those used in flavored yogurt, are commonly produced by mixing the fruit with sugar, pectin and acid and then treating the mixture to concentrate, sterilize and cool it in preparation for a hot or aseptic filling operation. Heretofore, commercial production of the preserves, when attempted in a continuous process, has encountered serious problems. In particular, if the concentration is carried to a desired high degree, for example 65° Brix, the particulate identity of the fruit is impaired and the final product has poor fruit integrity.

The most difficult fruit preserve to concentrate to 65° Brix while maintaining fruit integrity and distribution is strawberry, due to the very sensitive skin of this berry. If such concentration can be achieved with strawberries, then all other fruits, e.g., blueberry, boysenberry, cherry, etc., can be concentrated as well. The major problem is to keep the strawberries whole during the process of preheating, evaporating, cooking and cooling.

The principal object of the present invention is to provide a commercial method of producing fruit preserves, especially strawberry preserve, in a highly concentrated form such as 65° Brix, while maintaining good particulate identity and integrity of the fruit and good distribution of the fruit in the preserve.

According to the invention, a mixture of the fruit and sugars is slowly agitated, preferably for a period of 1–1½ hours, before adding to it a water solution of pectin to form a premix. The latter is heated to 90°–125° F. during gentle agitation, after which an acid solution is added to form a mixture which is then heated to 135°–145° F. during gentle agitation. The mixture is then passed through an evaporation zone at a temperature of 145°–160° F. under a vacuum of 20–27 inches Hg while gently agitating the mixture, to obtain a concentrated product. The latter is heated to a sterilizing temperature in the range of 190°–205° F. during gentle agitation and is then passed through a holding zone for 8 seconds to 3 minutes while at a temperature of 190°–205° F.

In the preferred method, the steps are performed continuously, the mixture going to the evaporation zone, containing by weight about 50% fruit, 18% cane sugar, 23.5% corn syrup, 7% pectin and 1.5% citric acid, and the mixture is concentrated to about 65° Brix in the evaporation zone.

The product produced by the new method can be added into yogurts and bakery products. It can also be used as a diluent in ice creams, candies and toppings.

Tests have shown that the integrity of the fruit in the final product is substantially impaired if the premix temperature is allowed to exceed 125° F. On the other hand, the premix temperature must be at least 90° F. to insure that the sugar and other ingredients added to the fruit are all in solution. Impairment of the fruit integrity also occurs if the temperature is allowed to exceed 145° F. in the preheating stage following addition of the acid solution. The latter is added after the pectin solution because once the acid is added; the viscosity of the mixture increases rapidly and the mass becomes very viscous.

The pectin content of the mixture should not be so high as to create graininess in the final product. Preferably, the pectin content is one or a combination of LM18CB and LM12CB and is dissolved in water to give it a concentration of 8.0 to 9.1% in the blend of fruit and sugar. It has been found that an 8.0% solution of these pectins in the premix provides a better transport matrix and gives a better fruit distribution in the final product.

An example of the invention will now be described in conjunction with the accompanying drawing, in which the single illustration is a schematic view of a system for carrying out the new method.

The system as illustrated comprises a jacketed Breddo "Likwifier" 10 having a two-speed agitator. In this vessel 10 the pectin solution is prepared by adding the pectin to water at 175° F., giving the solution a temperature of 150° F. After thawing strawberries overnight, they are dumped into a jacketed horizontal mixing tank 11 where cane sugar and corn syrup are added, the resulting blend being slowly agitated and gradually raised to 110° F. The pectin solution in vessel 10 is transferred at 150° F. through pipe 12 to tank 11, thereby raising the temperature of the blend to 125° F. The resulting premix at the latter temperature is agitated gently for 15 minutes, followed by addition of the acid solution and further gentle agitation to form a mixture of berries and matrix to be evaporated.

Prior to evaporation, the mixture from mixing tank 11 is delivered by pump 13 to a pair of series-connected pre-heaters 14–15 where the temperature of the mixture is raised to 145° F. The pre-heaters 14–15 are provided with devices for gently agitating the mixture during heating, and they may be Contherm heaters sold by Contherm Division of Alfa-Laval Inc., Fort Lee, N.J. A Contherm heater has a 6" diameter heat transfer tube with an internal 3" diameter staggered bladed shaft.

From pre-heater 15 the mixture is delivered to the separation chamber of Evaporator 17 where water is evaporated at 145° F. under a vacuum of 25 inches Hg, thereby providing a product having the desired concentration, such as a Brix of about 65°. The product is agitated gently while in the separation chamber of Evaporator 17, which may be a Convap sold by said Contherm Division.

The concentrated product is delivered by pump 18 from the separating chamber of evaporator 17 to another heater 19 (which may be a Contherm having the same Geometric Design Parameters as the Contherm Preheaters) where it is heated during gentle stirring to a sterilizing temperature in the range of 190°–205° F. It is then passed through a 1½" diameter holding tube 20 while at a temperature of 185°–205° F. and thence through line 21 to a cooler 22 where it is cooled rapidly to 80°–90° F. during gentle agitation. From cooler 22, the product can be passed at 23 to a bagging operation. If desired, instead of passing the sterilized product to cooler 22, it can be diverted from line 21 at 24 to a hot filling operation.

To effect gentle agitation in the above example, the Contherms 14–15 are operated at 90 RPM, the Convap 17 at 150 RPM and the Contherm 19 at 120 RPM.

Examples of the contents of the mixture going to the evaporator are:

EXAMPLE 1

| | |
|---|---|
| 570 lbs. strawberries | (150 lbs. solids) |
| 206 lbs. cane sugar | (206 lbs. solids) |
| 266 lbs. corn syrup | (213.6 lbs. solids) |
| 15 lbs. 18 CB LM pectin | (8.17 lbs. solids) |
| 75.4 lbs. hot water for pectin | |
| 2 qts. citric acid, 50% solution | |

EXAMPLE 2

| | |
|---|---|
| 540 lbs. | strawberries |
| 356 lbs. | cane sugar |
| 69 lbs. | corn syrup |
| 14 fl. ozs. | citric acid solution, (50%) |
| 28 fl. ozs. | black raspberry concentrate |
| 5 lbs. 6 ozs. pectin | LM 18 CB pectin |

EXAMPLE 3

| | |
|---|---|
| 570 lbs. | strawberries |
| 114 lbs. | cane syrup |
| 4 lbs., 1½ ozs. | locust bean gum |
| 2 lbs., 7 ozs. | guar gum |
| 32 gals. | water |

I claim:

1. A process for the production of a fruit preserve, which comprises the steps of slowly agitating a blend of about 50% fruit and 41.50% sugar, adding to said blend a water solution of pectin to form a premix having about 8.0 to 9.1% of pectin, heating a stream of said premix to a temperature of 90°–125° F. during gentle agitation of the premix, then adding a sufficient amount of a citric acid solution to the premix, to obtain a concentration of about 1.5% citric acid in the premix, then heating a stream of the resulting mixture to a temperature of 135°–145° F. during gentle agitation thereof, then passing said mixture through an evaporation zone at a temperature of 145°–160° F. under a vacuum of 20-27" Hg while gently agitating the mixture for a period of time sufficient to obtain a concentrated product, heating a stream of said product to a sterilizing temperature in the range of 190°–205° F. during gentle agitation thereof, and then passing the product through a holding zone for 8 seconds to 3 minutes while at a temperature of 185°–205° F. to provide said fruit preserve.

2. The method of claim 1, in which said steps are performed continuously.

3. The method of claim 1, in which said sugar is a combination of cane sugar and corn syrup.

4. The method of claim 1, in which said blend of fruit and sugar is agitated for 1–1½ hours before adding said pectin solution.

5. The method of claim 1, in which said mixture contains by weight about 50% fruit, 18% cane sugar, 23.5% corn syrup, 7% pectin and 1.5% citric acid.

6. The method of claim 1, in which said mixture is concentrated to a Brix of about 65° in said evaporation zone.

7. The method of claim 1, in which said fruit is selected from the group consisting of strawberries, blueberries, boysenberries and cherries.

8. The method of claim 1, in which the product is passed from said holding zone to a cooler where it is cooled rapidly to 80°–90° F.

9. The method of claim 1, in which the product is passed from said holding zone to a hot filling operation.

* * * * *